US011237952B1

(12) United States Patent
Pearson et al.

(10) Patent No.: US 11,237,952 B1
(45) Date of Patent: Feb. 1, 2022

(54) RUNTIME CLASS RECOMPILATION DURING MUTATION TESTING

(71) Applicant: State Farm Mutual Automobile Insurance Company, Bloomington, IL (US)

(72) Inventors: Andrew L Pearson, Normal, IL (US); Nate Shepherd, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 17/225,027

(22) Filed: Apr. 7, 2021

(51) Int. Cl.
G06F 9/44 (2018.01)
G06F 11/36 (2006.01)
G06F 8/30 (2018.01)
G06F 8/41 (2018.01)

(52) U.S. Cl.
CPC .......... G06F 11/3688 (2013.01); G06F 8/315 (2013.01); G06F 8/447 (2013.01)

(58) Field of Classification Search
CPC ............. G06F 11/3672; G06F 11/3688; G06F 11/2664; G06F 8/315; G06F 8/447
USPC ....................................................... 717/124
See application file for complete search history.

(56) References Cited

U.S. PATENT DOCUMENTS

| | | | |
|---|---|---|---|
| 6,324,639 B1 * | 11/2001 | Heishi ................. | G06F 9/30149 712/206 |
| 7,089,272 B1 | 8/2006 | Garthwaite et al. | |
| 10,387,295 B1 | 8/2019 | Kesarwani | |
| 2003/0025722 A1 * | 2/2003 | Cliff ........................ | A63F 13/12 715/700 |
| 2003/0233614 A1 * | 12/2003 | Mohamed ............. | G06F 40/166 715/255 |
| 2005/0166094 A1 * | 7/2005 | Blackwell ........... | G06F 11/3688 714/38.14 |
| 2005/0188364 A1 * | 8/2005 | Cockx .................... | G06F 8/456 717/159 |
| 2005/0240737 A1 * | 10/2005 | Holt ........................ | G06F 9/445 711/148 |
| 2008/0109641 A1 | 5/2008 | Ball et al. | |
| 2008/0307006 A1 * | 12/2008 | Lee ..................... | G06F 11/3684 |
| 2010/0146490 A1 * | 6/2010 | Grosse .................. | G06F 30/398 717/131 |

(Continued)

OTHER PUBLICATIONS

Recent patents on computational intelligence, author: DA Elizondo et al, published on 2018.*

(Continued)

Primary Examiner — Chameli Das
(74) Attorney, Agent, or Firm — Lee & Hayes, P.C.

(57) ABSTRACT

The present disclosure provides a mutation test manager configured to initialize multiple computing threads configuring a computing host to perform parallel computation; mutate class files within context of each computing thread; recompile mutated class files independently in each respective computing thread to generate heterogeneous mutants; and execute pending unit tests against heterogeneous mutants independently in each respective computing thread. Consequently, the mutation testing process is decoupled from computational bottlenecks which would result from linear, sequential generation, compilation, and testing of each mutation, especially in the context of JVM® programming languages configured to generate class-rich object code.

24 Claims, 4 Drawing Sheets

(56) References Cited

U.S. PATENT DOCUMENTS

| | | | |
|---|---|---|---|
| 2015/0095894 A1 | 4/2015 | Tripp | |
| 2015/0100951 A1* | 4/2015 | Raundahl Gregersen | G06F 9/44521 717/166 |
| 2015/0309914 A1* | 10/2015 | Eddington | G06F 11/3624 717/124 |
| 2017/0012819 A1* | 1/2017 | Rah | G06F 9/5077 |
| 2017/0068612 A1* | 3/2017 | Herzig | G06F 11/3672 |
| 2018/0095869 A1 | 4/2018 | Peer et al. | |
| 2019/0227786 A1* | 7/2019 | Price | G06F 8/65 |
| 2020/0042882 A1* | 2/2020 | Liu | G06N 10/00 |
| 2021/0096831 A1* | 4/2021 | Satyarth | G06N 3/126 |

OTHER PUBLICATIONS

Invasive software testing: Mutating target programs to diversify test exploration for high test coverage, author: Y kim et al, published on 2018, source: IEEE.*

Title: Learning how to mutate source code from bug-fixes, author: M Tufano et al, Source: IEEE, published on 2019.*

Title: Invasive software testing: Mutaing target program to diversity test exploration for high test coverage: author: Y kim et al, soure: IEEE, published on 2018.*

Title: Fuzzing javascript engines with aspect-preserving mutation, author: S Park , published on 2020.*

Title: Lime: a java-compatible and synthesizable language for heterogeneous architecturesJ author: Auerbach, published on , 2010.*

Gligoric, et al., "Selective Mutation Testing for Concurrent Code", ISSTA, Jul. 2013, pp. 224-234.

Irvine, et al., "Jumble Java Byte Code to Measure the Effectiveness of Test Units", Testing: Academic and Industrial Conference—Practice and Research Techniques, Mar. 2007, pp. 169-175.

Office Action for U.S. Appl. No. 17/224,873, dated Jun. 16, 2021, "Mutation Testing in Parallel Threads", 23 Pages.

Office Action for U.S. Appl. No. 17/224,904, dated Sep. 7, 2021, Pearson, "Mutation Testing Within Continuous Integration Systems", 26 pages.

* cited by examiner

300

COMPILER IS CONFIGURED BY PROCESSOR EXECUTING COMPILER SCRIPT TO RUN TEST
CLASS TEAR DOWN METHOD
302

COMPILER IS CONFIGURED BY PROCESSOR EXECUTING COMPILER SCRIPT TO RUN TEST
CLASS SET UP METHODS
304

COMPILER IS CONFIGURED BY PROCESSOR EXECUTING COMPILER SCRIPT TO COMPILE
CLASS FILE CONTAINING MUTATED LINE, OUTPUTTING MUTANT CLASS OBJECT CODE
306

RUNTIME CLASS RECOMPILATION DURING MUTATION TESTING

BACKGROUND

A versatile feature of virtual machine programming languages, targeting runtime environments such as the Java® Virtual Machine ("JVM®"), is that they may support dynamic recompilation at runtime. After source code is compiled to object code, errors in the object code may be detected by various forms of static or dynamic unit testing, where static testing is performed outside of runtime while dynamic testing is performed during runtime.

Dynamic testing may reveal errors in object code which are not revealed by static testing, since the execution of the object code will cause read and write accesses to particular memory addresses, read and write accesses of memory blocks, read and write accesses to particular files on non-volatile storage, and such events which only take place during runtime. Dynamic testing provides a basis for more sophisticated testing techniques, such as mutation testing, wherein the underlying source code is mutated at various positions. Existing test suites are run against compiled object code. The quality of test suites against arbitrary changes in the object code is determined by whether tests fail, as expected, against these mutations. The more mutations are generated, the more effective the mutation testing may be in detecting test quality.

Gosu® is an example of a JVM® programming language, targeting development environments such as enterprise software applications utilized in the property and casualty insurance industry. Languages such as Gosu® are specialized to generate a large number of Java® classes with minimal coding. Consequently, in such software development environments, test suites also require large numbers of unit tests to verify the expected behavior of the object code. Gosu® implements a version of the Framework for Integrated Tests ("FIT"), a testing tool for software development wherein tests may be created based on steps and expected outcomes, allowing thousands of tests to be created using a streamlined process.

However, using FIT testing tools as implemented presently to support Gosu®, tests are run after compiling target object code in its entirety. This is incompatible with mutation testing techniques; since each individual mutation must be tested separately, each mutation would require a full re-compilation of all of the object code. Compounded by multiple mutations for each of thousands of unit tests in a suite, full-fledged mutation testing for a typical Gosu® application may take years in real time using current testing tools. Thus, there is a need to integrate the flexibility to perform mutation testing into development tools for programming languages such as Gosu® targeting a JVM® development environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing a programming language compiler, and more specifically implementing a compiler operative to perform iterative, per-class compilation directed to individual mutations of target source code during runtime and mutation testing of the target object code.

Figure 1:
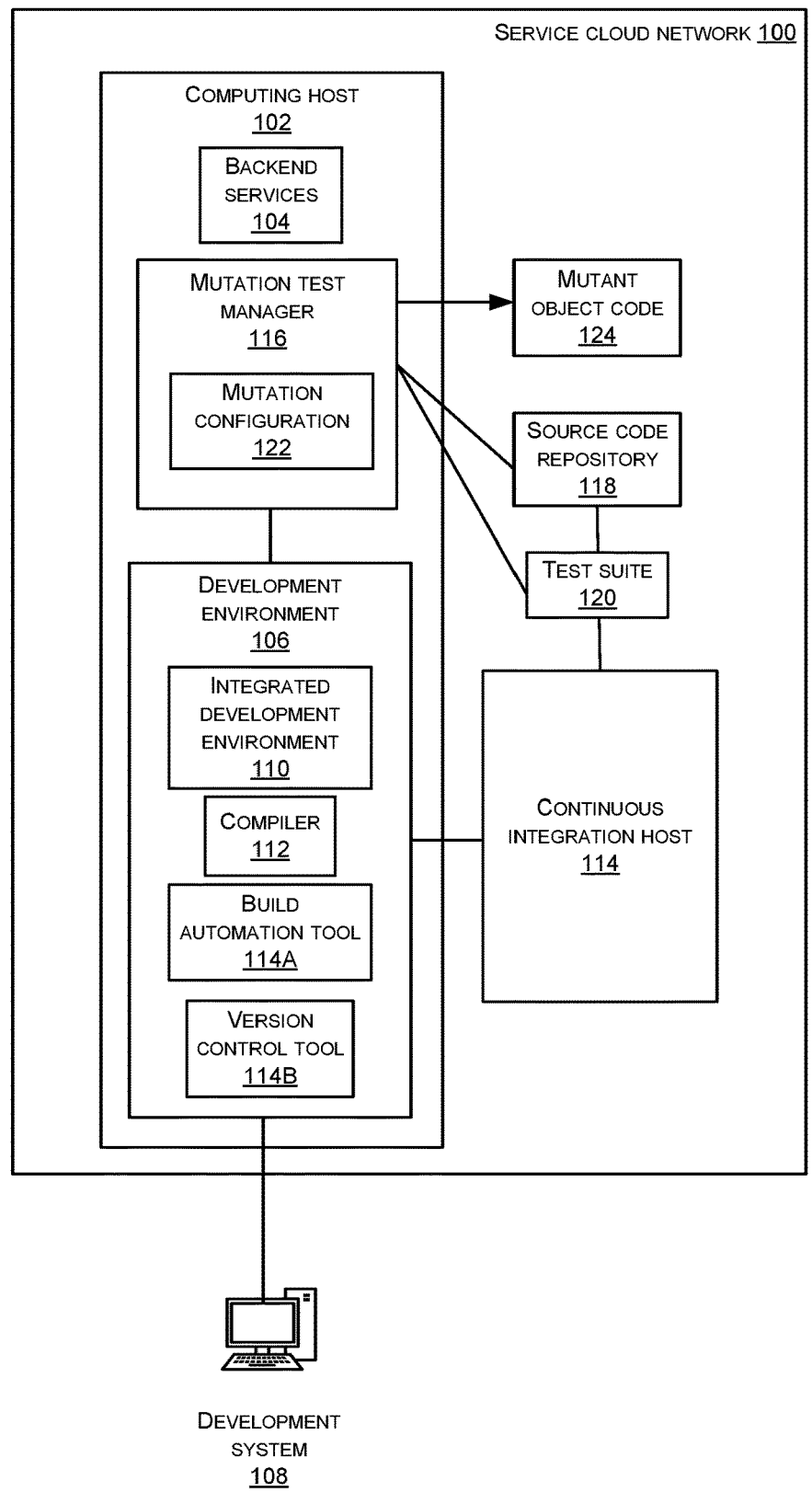
FIG. 1 illustrates an architectural diagram of a service cloud network according to example embodiments of the present disclosure.

FIG. 1 illustrates an architectural diagram of a service cloud network 100 according to example embodiments of the present disclosure. According to example embodiments of the present disclosure, a service cloud network 100 includes one or more computing hosts 102 including computing resources such as physical and/or virtual processors, memory, storage, computer-executable applications, computer-readable data, and the like. Additionally, over one or more computer networks, the one or more computing hosts 102 may receive inbound traffic from external hosts originating from outside networks, such as personal area networks ("PANs"), wired and wireless local area networks ("LANs"), wired and wireless wide area networks ("WANs"), the Internet, and so forth, which may pass through gateways, firewalls, and the like.

Computing hosts 102 of the deployment server 100 may be servers which provide computing resources for each other as well as for client devices (not illustrated) which connect to the computing hosts 102 over one or more computer networks. These computing resources may include, for example, computer-executable applications, databases, platforms, services, virtual machines, and the like. According to example embodiments of the present disclosure, computing resources hosted by computing hosts 102 users of client devices may be property and casualty insurance policyholders and prospective policyholders, and hosted computing resources may be end user-facing Web applications providing functionalities to client device users such as policy estimates, policy underwriting, policy payments, and the like.

Computing resources hosted on the computing hosts 102 may further include backend services 104, a development environment 106, and development tools. Such computing resources may be provided for development systems 108 which connect to the computing hosts 102 over one or more computer networks. According to example embodiments of the present disclosure, computing resources hosted by computing hosts 102 may include an integrated development environment ("IDE") 110 and a compiler 112. Furthermore, one or more computing hosts 102 may be configured as a continuous integration ("CI") host 114, which is configured to integrate with build automation tools 114A such as Apache Maven and the like, and version control tools 114B such as Git, CVS, Apache Subversion, and the like.

The integration of an IDE 110, a compiler 112, and a build automation tool 114A with a CI host 114 enable operators of a development system 108 to connect to the computing hosts 102 and access these computing resources, as well as the CI host 114, to build, test, and deploy customized object code to be run in the context of end user-facing Web applications. For example, a user operating a development system 108 may connect to computing hosts 102 of a service cloud network 100, and run remotely an IDE 110 hosted at one or more computing hosts 102 (or run a local copy of the IDE 110 downloaded to the development system 108) to write source code defining hosted Web applications and various functions thereof.

The user may operate the IDE 110 to trigger a commit of the source code. A version control tool 114B, being integrated with the IDE 110, may be configured to record changes made by the user as a revision of an underlying source code repository, such as a revision on a development branch, using version control techniques as known to persons skilled in the art.

Alternatively, any combination of the IDE 110, the CI host 114, the build automation tool 114A, the version control tool 114B, and otherwise elements of the development environment 106 and the development system 108 may be configured to, individually or in combination, trigger a compile of the commit code, a merge of a development branch of the source code with a main branch, and otherwise trigger a commit of the source code as described herein.

The CI host 114, being integrated with the version control tool 114B, may be configured to perform a build of the revision by triggering compilation of a collection of class files in a project each as respective object code, and package all respective object code in a directory hierarchy in an application file, such as a Web application resource ("WAR") file. The CI host 114 may further be configured to trigger testing of the built application file. In the event that the revision to the source code passes testing, the CI host 114 may further be configured to trigger merging of the revision branch to the main source code repository, and trigger deployment of the built application file as a live hosted end user-facing Web application, in succession, as shall be described subsequently.

Hosted Web applications as described above may be developed as source code by users acting on behalf of a customer of the service cloud network 100 (for example, a property and casualty insurance provider), the hosted Web applications including calls to application programming interfaces ("APIs") of the backend services 104 so that any number of functions of the backend service (such as billing management services, insurance claim management services, document storage services, end user authentication services, actuarial services, and the like) may be integrated with the hosted Web applications to support functions of the hosted Web applications.

Before hosted Web applications can be deployed, their developer-defined functionality should be comprehensively tested so as to verify that the Web application is reasonably free from bugs, errors, malfunctions, and the like. Developers may manually define, or use testing tools to define, a variety of unit tests configured to verify that the behavior of hosted Web applications is in accordance with the developer's expectations and/or end users' expectations. Each unit test may define inputs into one or more sections of target object code to be tested; possible outputs from the target object code; and conditions (i.e., corresponding sets of inputs and/or outputs) which define success and/or failure of the unit test.

For each section of target object code (such as one or more classes making up a WAR file, as described above), a developer may define any arbitrary number of tests, which may be designed to collectively cover arbitrarily many aspects of the behavior of the target object code (conceptually referred to as "test coverage"), while minimizing overlap between the coverage of individual tests. Using automated testing tools such as the Framework for Integrated Tests ("FIT"), a developer may readily generate an arbitrarily large number of tests for any individual class, repeating this process for all other classes. Thus, in the ordinary course of development, a developer may readily generate a test suite including hundreds or thousands of unit tests directed to target object code.

A CI host 114, being integrated with a version control tool 114B, a build automation tool 114A and a testing tool as described above, may automate the building and testing of target object code upon a developer committing a source code revision. For each source code revision, numerous tests in a test suite may need to pass successfully before the revision can be safely merged with the source code repository. Therefore, by automating build and test procedures, the CI host 114 may enable developers to focus on the tasks of writing and correcting source code without undertaking extensive manual operation of testing tools, or extensive manual review of non-informative test results. The CI host 114 may autonomously report test failures to prompt developers to correct errors that led to those test failures, or may autonomously merge branch revisions into the source code repository upon all tests successfully passing.

Consequently, due to the large-scale automation surrounding building and testing by a CI host 114, there is a further need to evaluate quality of unit tests of a test suite which may have been manually defined by a developer, may have been autonomously generated by the testing tool, or may have been manually defined to some extent by a developer with the assistance of automation by the testing tool. In the context of a JVM® programming language such as Gosu®, development tools enable the rapid creation of many classes, each of which may be compiled as a separate class object. Each individual class object, or collections of class objects, may require multiple tests. Consequently, just as tests need to be generated on an automated basis, the quality of these tests also needs to be evaluated on an automated basis to alleviate developer workload.

Thus, according to example embodiments of the present disclosure, the hosted computing resources further include a mutation test manager 116. The mutation test manager 116 may further be integrated with the version control tool 114B, the build automation tool 114A, and the testing tool, so that the mutation test manager 116 may access the source code repository 118 and revisions thereof managed by the version control tool 114B; may access a compiler 112 integrated with the build automation tool 114A; and may access a test suite 120 generated by the testing tool. A test suite 120 may further include unit tests defining inputs, outputs, and success or failure conditions as described above; each unit test may also be defined as a class object, such as a .gs file.

Unit tests may be multifarious in their success or failure conditions, and in the aspects of target object code covered by each unit test. For example, given target object code configured having dependency upon one or more records of a database, some number of unit tests may be conditioned upon whether the target object code can access the database, can access particular tables of the database, and/or can access particular records in the database. Further unit tests may be conditioned upon whether the target object code correctly processes and/or records certain user input as expected, whether the target object code produces expected output based on certain input, whether the target object code interfaces as expected with other object code and/or remote network elements, and/or any other functionality of the target object code.

Unit tests may also be based on regulatory requirements, state laws, business requirements, rules, and/or other non-computational factors. For instance, in the case that target object code is part of a policy management system that manages insurance policies, different states or jurisdictions may have different laws relevant to how such insurance policies are to be managed. Accordingly, some unit tests may check that the software application enforces rules of a first jurisdiction upon insurance policies as expected, while other unit tests may check that the software application enforces rules of a second jurisdiction upon insurance policies as expected.

Unit tests may also be designed to test functionality implemented based on lines of source code in specific class objects of source code. Accordingly, particular unit tests may be generated corresponding to particular class objects of the target source code (which may be source code of a main branch of a source code repository or a source code revision of any developer branch, without limitation; subsequently, for brevity, any such version of source code used as the basis for mutation testing shall be referred to, interchangeably, as "target source code").

In order to determine quality of a test suite 120, the mutation test manager 116 may be configured to intervene in the build and test processes by generating mutations in source code revisions prior to compilation. The mutation test manager 116 may generate mutations in accordance with a mutation configuration 122. A mutation configuration 122 may include mutation patterns which specify possible modifications causing mutation of a source code revision. Mutation patterns may include, for example, faults which may be introduced into lines of the source code revision, such that compilation of the non-mutated source code revision and compilation of the mutated source code revision result in a non-mutant object code and a mutant object code, both different in functionality.

For example, mutation patterns may describe swaps of variables, rearrangements of variables, and changes to variables of source code; may describe changes of logical operators of source code; may describe changes of data types of variables of source code; may describe deletions and insertions of logical operators of source code; may describe deletions of statements, insertions of statements, and changes to statements of source code; may describe replacement of constants of source code with variables; and furthermore may describe any other functional change to source code.

The mutation test manager 116 may be configured to generate heterogeneous mutations at scale, based on mutating the same line of a source code revision based on different mutation patterns, as well as based on mutating different lines of a source code revision based on the same mutation patterns and/or based on different mutation patterns. To be heterogeneous, each mutation need only include one change to one class object of a source code revision. Thus, for example, given five hundred class objects in target source code, the mutation test manager 116 may generate at least one mutation, as well as many more heterogeneous mutations, for each class object; assuming the mutation test manager 116 generates one hundred heterogeneous mutations for each class object, the mutation test manager 116 may generate fifty thousand heterogeneous mutations over the entirety of the target source code.

By integration with the build automation tool 114A and the testing tool, the mutation test manager 102 may configure the build automation tool 114A to compile each mutation (in a manner as shall be described subsequently) and configure the testing tool to execute some or all unit tests of the test suite 120 against each of the heterogeneous mutations (where the nature of each heterogeneous mutant shall be described subsequently). Upon failure of a unit test run against a heterogeneous mutant, that heterogeneous mutant is referred to as "killed." Upon success of a unit test run against a heterogeneous mutant, that heterogeneous mutant is referred to as "survived."

For example, some number of unit tests are run against a first mutation, including a first unit test, a second unit test, and a third unit test. Among these, a first unit test conditioned upon a first class object being expected to output a positive value may fail after a mutation pattern is applied to a line of the class source code of the first class object, causing a negative value to be output. For this first mutation, the unit test may be intentionally designed to fail if the first class object outputs a negative value. Accordingly, by the failure of the first unit test, the first mutation may be successfully detected and "killed." At the same time, the second unit test may be conditioned upon a second class object being expected to output a calendar date; since the first mutation does not change this output, the second unit test does not kill the first mutation.

Next, some number of unit test are run against a second mutation, which may include the first unit test, the second unit test, and the third unit test. The second unit test may kill a second mutation which replaces a calendar date output by the second class object with a non-calendar date value, while the first unit test and the third unit test do not kill the second mutation. In the event that further unit tests continue to kill further heterogeneous mutations, the quality of the test suite 120 may be considered to be high, and thus there may be little need to manually alter tests of the test suite 120 or to write new tests.

However, in the event that a third mutation deletes an assignment statement from a third class object, and none of the unit tests fails as a result of this deletion, the third mutation survives. This may indicate that quality of the test suite 120 is inadequate. In response, a developer may manually alter a unit test or may write a new unit test, so that at least one unit test of the test suite 120 will fail as a result of this third mutation, ameliorating the inadequate quality of the test suite 120.

An overall quality of the test suite 120 may be measured based on a number or percentage of heterogeneous mutants killed by unit tests of the test suite 120. For example, in the event that unit tests of the test suite 120 kill 95% of heterogeneous mutants generated for target source code, quality of the test suite 120 may be described as comparatively high. However, in the event that unit tests of the test suite 120 only kill 40% of heterogeneous mutants generated, quality of the test suite 120 may be described as comparatively poor. In response, a developer may manually, as well as with autonomous assistance by a testing tool, revise unit tests and write new unit tests in a test suite 120 to kill a higher percentage of heterogeneous mutants, thereby improving robustness of unit tests against a broader range of possible unexpected behavior by the target object code.

According to example embodiments of the present disclosure, due to the large scale of unit tests created in a test suite 120, the test activities as described above are respectively executed by a computing host 102 substantially concurrently in multiple computing threads running in parallel, such as running on different cores of a same processor or on different processors concurrently. The mutation test manager 116 may configure one or more computing hosts 102 to initialize multiple computing threads prior to generating heterogeneous mutants. Upon the mutation test manager 116 generating some number of heterogeneous mutants based on target source code, the mutation test manager 116 may assign a different heterogeneous mutants to each computing thread, and, in each computing thread, may execute some or all unit tests of a test suite 120 against the heterogeneous mutant of that computing thread. Thus, a same set of unit tests may be run concurrently against different heterogeneous mutants in each of any arbitrary number of computing threads.

Benefits of such concurrent execution include reduction in mutation testing times, reduction in computing resource consumption during mutation testing, and the like; these benefits need not be detailed further for the purpose of understanding the present disclosure.

It should be understood that the mutation test manager 116 may configure one or more computing hosts 102 to initialize computing threads in virtual machines, by hyper-threading, and/or according to any other implementation of parallel computing. The mutation test manager 116 may initialize any arbitrary number of computing threads on one or more computing hosts 102, limited by only computing resources available such as number of processors, number of cores of each processor, memory capacity, and the like. For example, a computing host 102 may be a server configured with 128 GB of memory and 16 CPUs. In this example, in the event that the target object code typically consumes approximately 15 GB of memory when executed during mutation testing, the mutation test manager 116 may initialize eight computing threads that are each allocated 16 GB of memory on the computing host 102. The mutation test manager 116 may, accordingly, cause each of the eight computing threads to perform mutation testing against a different heterogeneous mutant.

It should further be understood that the mutation test manager 116 may further dynamically adjust the number of computing threads running concurrently during the mutation testing, based on monitoring real-time and/or historical metrics of computing resource consumption.

According to example embodiments of the present disclosure, the mutation test manager 116 may execute a compiler 112 in each of the computing threads to build the target source code. The mutation test manager 116 may also assign each computing thread to perform mutation testing based on source code revisions to one or more particular class objects, or a class object package. In each computing thread, the mutation test manager 116 may mutate a class object in a heterogeneous fashion according to a mutation configurations 122, such that the compiler 112 running in the thread can compile the mutation as mutant object code. Henceforth, compilation of a mutation as mentioned above shall be described in further detail.

According to example embodiments of the present disclosure, compilers 112 may be executed by one or more general-purpose processor(s) and/or special-purpose processor(s) of a computing host 102. General-purpose processor(s) and special-purpose processor(s) may be physical hardware processors or virtualized processors. General-purpose processor(s) may generally be high-powered in terms of frequency and may generally provide a generally supported Instruction Set Architecture ("ISA"), such as x86 and the like, enabling them to run computer-executable instructions programmed in a variety of programming languages. Special-purpose processor(s) are more likely to be physical processors such as ASICs, field programmable gate arrays ("FPGAs"), Neural Network Processing Units ("NPUs"), or otherwise accelerator(s) configured to execute particular computer-executable instructions with less computation time than general-purpose processor(s). As a tradeoff, special-purpose processor(s) may be reduced in computational resources, such as memory, functional units such as floating-point units ("FPUs") and memory management units ("MMUs"), and the like, compared to general-purpose processor(s).

Additionally, compilers may be subject to target-specific compilation constraints. Generally, a compiler target may refer to a particular hardware architecture operative to execute object code output by a compiler. Object code output by a compiler may be executable by one target, but at the same time may not be executable by another target. According to example embodiments of the present disclosure, a target of a compiler 112 may be the Java Virtual Machine ("JVM®").

Example embodiments of the present disclosure provide computer-executable instructions which cause a computing system to run a development interface that enables a user to operate the computing system to write source code in accordance with syntax of a JVM® programming language—that is, a programming language compiled targeting the JVM®—debug the source code, and compile the source code by executing a compiler according to example embodiments of the present disclosure.

The development interface executed by the computing system may be, for example, an IDE 110, and/or other automated scripts or software tools running on development systems as known to persons skilled in the art, which provides functional components and interfaces for external integrated components, such as a source code editor, a build automation interface, a version control system, class and object browsers, a compiler interface, and further such functions as known to persons skilled in the art of software development.

According to example embodiments of the present disclosure, in memory allocated to a computing thread, a compiler 112 may be configured to compile target source file including one mutated source code class file, with all other source code class files being non-mutated. The compiler outputs mutant object code in the form of, for example, a WAR file. In memory allocated to the computing thread, the mutation test manager 116 then loads the mutant object code into its target runtime environment, such as by loading the mutant object code into memory allocated to a running JVM® instance. The mutant object code replaces its corresponding non-mutant object code in the target object code, which is already running in the JVM® instance.

The mutation test manager 116 then executes some or all pending unit tests (as shall be subsequently described) of a test suite 120 against the running target object code. The unit tests are executed against the entirety of the running target object code, since the mutant object code by itself does not make up the complete functionality of the object code. It is expected that, by executing unit tests after loading the mutant object code, the unit tests will be executed against the mutant object code; however, in practice this is not guaranteed. Therefore, FIG. 3 subsequently describes additional steps which may be performed to ensure that the unit tests will be executed against the mutant object code. Subsequently, wherever the present disclosure may state that unit tests are executed against particular mutant object code, it should be understood that this is for conceptual understanding only. In all such cases the unit tests are executed against the entirety of target object code, with the expectation that the referenced mutant object code is already loaded into the target object code, and taking into consideration the possibility that the referenced mutant object code may not have been successfully loaded into the target object code, and that further measures such as those described with reference to FIG. 3 may be required.

The above may be performed any number of times with regard to any number of heterogeneous mutants; in each case, the compiler may compile target source code including one mutated source code class file (heterogeneity being maintained as described above), and may execute some or all unit tests of a test suite 120 against heterogeneous mutant object code compiled in this manner.

Different computing threads may perform the above-described steps upon different heterogeneous mutants substantially concurrently, achieving benefits such as reduction in mutation testing times, reduction in computing resource consumption during mutation testing, and the like. For example, if the mutation test manager 116 initializes ten computing threads, it may test a fixed number of heterogeneous mutants in approximately one-tenth the time compared to sequential mutation testing in a single computing thread.

However, even upon alleviating the bottleneck of sequential mutation testing, the mutation test manager 116 may still create another bottleneck due to the need to compile every mutant object code individually. The sheer number of class objects which may be created in a WAR file means that compilation of the entire target object code may encounter a floor in terms of computational time and resources, and cannot be made more efficient than this floor. Moreover, after loading mutant object code into memory of a target runtime environment such as a running JVM® instance, in order to reuse the same target runtime environment for subsequent mutation testing, the target runtime environment must be stopped so that a new mutant object code may be loaded into memory, again incurring computational resource consumption and performance costs.

Therefore, according to example embodiments of the present disclosure, the mutation test manager 116 is configured to, in addition to and during concurrent mutation testing as described above, perform class recompilation rather than compilation of the entire target object code. In this class recompilation process, the mutation test manager 116 may configure a compiler 112 running in a computing thread to compile one mutated source code class file, without compiling all other non-mutated source code class files.

Thus, upon launching a target runtime environment in each computing thread, the mutation test manager 116 may configure the target runtime environment to load a non-mutant target object code at first. The non-mutant target object code may be pre-compiled outside the computing threads and loaded into memory allocated to each computing thread, or may be compiled by a compiler 112 executing in each of the computing threads from non-mutant target source code (such as source code as recorded in a main branch of a source code repository).

For example, a compiler 112 may compile a WAR file based on all of the source code class files in the non-mutated target source code. The mutation test manager 116 may load copies of the compiled WAR file, representing a non-mutant target object code, to each of the computing threads for execution. Alternatively, the mutation test manager 116 may configure a compiler 112 running in each computing thread to compile a WAR file based on all of the source code class files in the non-mutated target source code. Each of the computing threads may accordingly load a non-mutant target object code, compiled from a set of unmodified class files in the target source code, into memory allocated to the computing thread. For instance, each of the computing threads may, based on a WAR file constituting a non-mutant object code, load compiled bytecode class files into memory.

Furthermore, according to example embodiments of the present disclosure, the mutation test manager 116 may also mutate individual class files of the target source code in each computing thread based on a mutation configuration 122, then configure a respective compiler 112 running in that computing thread to recompile the mutated class files. Accordingly, the mutation test manager 116 may configure each individual computing thread to, independent from each other computing thread, re-compile a single mutated source code class file to generate mutant class object code (including one or more bytecode class files), rather than the entirety of mutant target object code, and configure the computing thread to replace a corresponding non-mutant class object code (already loaded into memory as part of the non-mutant target object code as described above) with the newly compiled mutant class object code and its constituent bytecode class files.

The mutation test manager 116 may, furthermore, configure each computing thread to perform the above-mentioned steps independent of each other computing thread. In such a fashion, the mutation test manager 116 may configure each computing thread to independently generate heterogeneous mutations, independently re-compile the generated heterogeneous mutations as mutated class object code without compiling the entire target object code, and independently replace a non-mutated class object code running in memory of a JVM® instance with the mutated class object code.

In this manner, the mutation test manager 116 may configure the compiler 112 to test mutant object files 110 in a more efficient fashion, and/or with reduced consumption of computing resources, such as reduced consumption of processor cycles, reduced consumption of power, reduced thread blocking during parallel computation, reduced consumption of memory, reduced consumption of storage space, reduced disk write latency and blocking, and the like, than compiling an entire WAR file for each generated heterogeneous mutant from all of the mutant and non-mutant class files of target source code. By configuring a compiler to perform class compilation instead of full source code compilation, computational bottlenecks resulting from superfluous compilation computational activity may be alleviated; by replacing running class object code with mutated class object code in a target runtime environment, computational bottlenecks resulting from pausing and resuming the running target runtime environment may be alleviated.

Furthermore, in order to enable the replacement of running class object code, the target runtime environment running in a computing thread should be a runtime environment which supports re-compilation of single class object code, and enables previously-compiled, running class object code to be replaced in memory, during runtime. For example, some JVM® implementations may not permit class recompilation and/or replacement of previously-compiled class object loaded into memory during runtime. Therefore, according to example embodiments of the present disclosure, each of the computing threads may execute a Dynamic Code Evolution Virtual Machine ("DCEVM"), or other type of virtual machine that enables hot swapping and/or redefinition of classes loaded into memory at runtime. Each instance of the compiler 112 may therefore target a DCEVM runtime.

As discussed above, the mutation test manager 116 may configure unit tests of the test suite 120 to execute against heterogeneous mutants assigned to each computing thread. According to example embodiments of the present disclosure, the mutation test manager 116 may execute the test suite 120, or all unit tests among some subset of unit tests thereof (referred to collectively and interchangeably henceforth as "pending unit tests"), in sequence against a particular heterogeneous mutant assigned to a particular computing thread. For example, a first heterogeneous mutant may be exclusively assigned to a first computing thread, and so all pending unit tests for that mutant may be executed in that first computing thread.

Alternatively, according to other example embodiments of the present disclosure, a particular heterogeneous mutant may be assigned to more than one computing thread, in order to distribute computation load of mutation testing directed to individual mutants across concurrent computing workloads. For example, a first compiler may generate a first mutant class object code in a first computing thread as discussed above. However, the first computing thread may include, or may be associated with, a group of multiple computing threads. Accordingly, rather than executing all pending unit tests against the first mutant class object code in sequence, the mutation test manager 116, or a test manager associated with the first computing thread, may distribute the pending unit tests among the group of computing threads associated with the first computing thread. The group of computing threads may then each execute a subset of the pending unit tests, in a substantially concurrent fashion, against respective copies of the first mutant class object code.

For example, the mutation test manager 116 may allocate some number of pending unit tests can among five computing threads, such that five different subsets of the pending unit tests may execute substantially concurrently against copies of a mutant class object code. By mutation testing a same mutant class object code in a distributed fashion concurrently, a mutation test manager 116 according to example embodiments of the present disclosure may achieve further reduction in mutation testing times and further reduction in computing resource consumption during mutation testing.

Upon each computing thread executing pending unit tests against mutant class object code, whether the pending tests are completed in sequence or at least partly concurrently, the computing threads may collectively generate and record mutation test results arising from the completed unit tests. Each individual mutation test result may record testing results from an individual mutant class object code, or may record testing results aggregated over all heterogeneous mutants derived from a same source code class file and/or source code class file package. For the purpose of understanding example embodiments of the present disclosure, details of recording mutation test results need not be further detailed.

Figure 2:
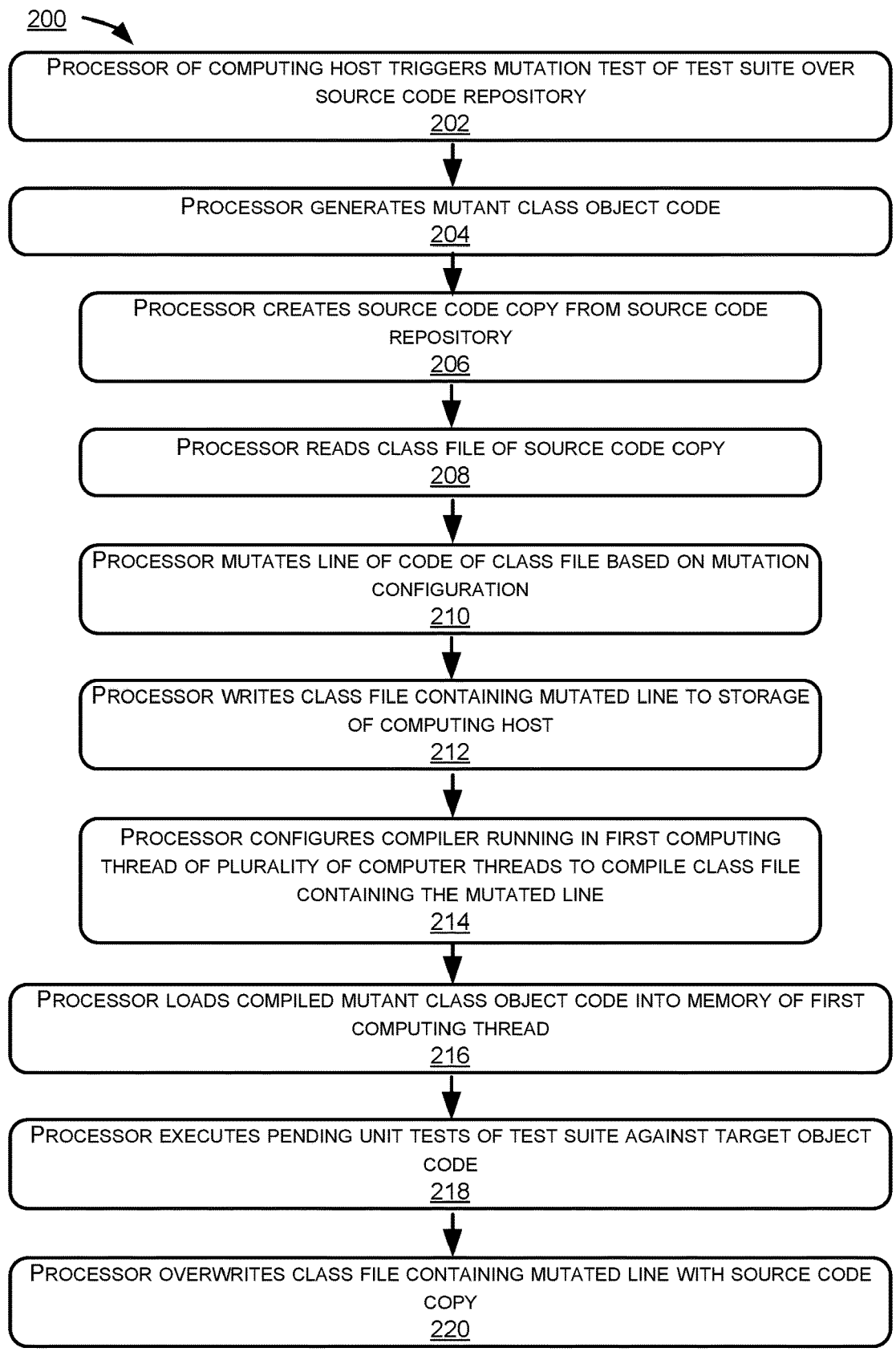
FIG. 2 illustrates a flowchart of a mutation testing process according to example embodiments of the present disclosure.

FIG. 2 illustrates a flowchart of a mutation testing process 200 according to example embodiments of the present disclosure. The process 200 may be implemented on one or more computing hosts 102 as referenced above, by a processor of the computing host 102, by executing computer-executable instructions such as those defined by a mutation test manager 116. An example system architecture for such a computing host 102 is described subsequently with reference to FIG. 5.

At a step 202, a processor of a computing host 102 (i.e., a computing host of a service cloud network 100, as described above) triggers a mutation test of a test suite over a source code repository. In particular, the mutation test manager 116 causes a processor of the computing host 102 to initialize a plurality of computing threads, each computing thread of the plurality of computing threads running a target runtime environment. In each respective computing thread of the plurality of computing threads, the mutation test manager 116 triggers a build of target object code based on target source code of the source code repository, and causes the respective computing thread to execute the target object code.

At a step 204, the processor of the computing host 102 generates a mutant class object code. The step 204 may further include sub-steps 206 through 214, which are described in further detail subsequently.

At a step 206, the processor of the computing host 102 creates a source code copy from the source code repository. While the mutation test manager 116, being integrated with a version control tool 114B hosted on a computing host of the service cloud network 100, may retrieve a copy of the source code from a source code repository, to avoid the inefficiency of repeatedly accessing the source code repository, the mutation test manager 116 may copy the source code from the source code repository and store a local copy for more immediate access. The local copy may be, for example, stored in a local file directory on storage of the computing host 102, and the like.

At a step 208, the processor of the computing host 102 reads a class file of the source code copy.

The mutation test manager 116 may iteratively read each line of code of the class file, and temporarily store the read lines of code in memory of the computing host 102 allocated to the mutation test manager 116. This may be iteratively performed an arbitrary number of times until the mutation test manager 116 has read all lines of code from the class file (without necessarily reading any other lines of code from the source code copy).

At a step 210, the processor of the computing host 102 mutates a line of code of the class file based on a mutation configuration.

As described above, the mutation configuration may include mutation patterns which describe faults which may be introduced into the line of code. During the process 200, the step 210 may ultimately be performed an arbitrary number of times, including any arbitrary number of iterations for each line of code, until the mutation test manager 116 has mutated all lines of code from the source code copy (or has mutated all lines which may be mutated according to a mutation configuration, and which may be covered by at least some subset of unit tests of the test suite 120), each line of code being mutated some number of times. In each iteration, any given mutation pattern may be applied to mutating the line of code, as long as the mutation pattern is heterogeneous (as defined above) with all other mutation patterns applied in all other iterations. However, the step 210 is only performed once for each performance of the steps 208 and 212.

At a step 212, the processor of the computing host 102 writes the class file containing the mutated line to storage of the computing host 102.

The line of code, upon being mutated in memory, is now flushed to non-volatile storage along with all other non-mutated lines of code of the class file. Each line being written to non-volatile storage may be iteratively performed an arbitrary number of times until the mutation test manager 116 has written all lines of code of the class file to storage.

It should be understood that steps 208-212 may collectively be performed in lockstep such that, upon completion, the entirety of target source code including the class file containing a mutated line of code is written to non-volatile storage.

At a step 214, the processor of the computing host 102 configures a compiler 112 running in a first computing thread of the plurality of computer threads to compile the class file containing the mutated line.

It should be understood that the compiler 112 may be operative to be configured by the mutation test manager 116 by the mutation test manager 116 running a compiler script which includes a parameterized call to the compiler 112 executable, automating the execution of the compiler 112 based on certain parameters. For example, the compiler script may be written as a Java processing class defining compilation parameters for a single class. In this manner, the mutation test manager 116 may run a compiler script which includes a parameterized call which configures a compiler 112 to execute compiling a single class file rather than all classes of the underlying source file.

The parameterized call may specify a compiler target for which the compiler 112 should output suitable object code for running in such a target runtime environment. For example, a compiler target may be a DCEVM, as described above.

At a step 216, the processor of the computing host 102 loads a compiled mutant class object code into memory of the first computing thread, replacing a non-mutant class object code of the running target object code in the target runtime environment.

At a step 218, the processor of the computing host 102 executes pending unit tests of the test suite 120 against the target object code.

As described above, pending unit tests may include some subset of unit tests of the test suite 120, or may include all unit tests of the test suite 120. The pending unit tests may include those unit tests of the test suite which cover the mutant class object code (in accordance with coverage as described above), and may exclude those unit tests of the test suite which do not cover the mutant class object code.

As described above, it should be understood that the pending unit tests are executed against the already running target object code in general, rather than against the mutant class object code specifically. Merely running the unit tests after replacing the non-mutant class object code may not adequately guarantee that the mutant class object code is loaded in memory and running by the time that the unit tests are running. Thus, subsequently, further measures are described for ensuring that the pending unit tests are actually executed against the mutant class object code at least once.

It should be understood that, by convention, JVM® languages provide a default test class in which unit tests are written, and the default test class provides default set up methods which are conventionally run to set up a default test environment for running test methods, and default tear down methods which are conventionally run after built-in test methods to clean up a default test environment for running test methods. According to example embodiments of the present disclosure, to ensure that pending unit tests are executed after loading the mutant class object code into memory, an environment for running default test methods may be cleaned up prior to running the pending unit tests, to ensure that the testing environment does not retain the non-mutant class object code to be replaced.

Figure 3:
FIG. 3 illustrates a workflow performed by a compiler in accordance with a compiler script according to example embodiments of the present disclosure.
Figure 3:

FIG. 3 illustrates a workflow performed by a processor of the computing host 102 in accordance with a compiler script according to example embodiments of the present disclosure. For illustrative purposes, one implementation of a compiler script, executed by the processor of the computing host 102, may result in the processor of the computing host 102 configuring the compiler 112 to perform at least the following steps, illustrated in FIG. 3.

At a step 302, the compiler 112 is configured by the processor of the computing host 102 executing the compiler script to run a test class tear down method.

At a step 304, the compiler 112 is configured by the processor of the computing host 102 executing the compiler script to runs test class set up methods. Thus, the previous test environment is discarded and a new test environment is initialized before any pending tests are run.

At a step 306, the compiler 112 is configured by the processor of the computing host 102 executing the compiler script to compile a class file containing a mutated line, outputting a mutant class object code.

The steps 302 and 304 may be then repeated to ensure that, in the test environment, the pending unit tests are run with the mutant class object code loaded into memory of the target runtime environment. It should be understood that, without repeating the steps 302 and 304, it may be possible that the pending unit tests may be inadvertently run against the non-mutant class object code at least once (though not necessarily), and may be run against the mutant class object code as expected at least once; however, as a result of the repeating of these steps 302 and 304 before and after compiling the class file containing the mutated line, the pending unit tests may be run against the mutant class object code without being run against the non-mutant class object code. In such outcomes, for two divergent outputs of the same unit test repeated, the mutation test manager 116 may record a failed output as a mutation test result, taking precedence over any successful output of the same unit test.

At a step 220, the processor of the computing host 102 overwrites the class file containing the mutated line with the source code copy.

Upon completion of the pending unit tests, class files written in storage are reverted to the source code copy. The source code copy may then be discarded.

The processor of the computing host 102 may iterate through all class files of the target source code, repeating the steps 202 through 204 and 216 through 220 for each class file which may be mutated according to a mutation configuration, and which may be covered by at least some subset of unit tests of the test suite 120. The steps 202 through 204 and 216 through 220 may be iteratively performed in any number of the computing threads initialized by the processor of the computing host 102, substantially concurrently with any of the other computing threads concurrently performing similar steps. Thus, in each computing thread, the processor of the computing host 102 may perform class recompilation of heterogeneous mutations of the same class, or class recompilation of mutations of different classes, substantially concurrently.

Example embodiments of the present disclosure implement a mutation test manager configured to initialize multiple computing threads configuring a computing host to perform parallel computation; mutate class files within context of each computing thread; recompile mutated class files independently in each respective computing thread to generate heterogeneous mutants; and execute pending unit tests against heterogeneous mutants independently in each respective computing thread. Consequently, the mutation testing process is decoupled from computational bottlenecks which would result from linear, sequential generation, compilation, and testing of each mutation, especially in the context of JVM® programming languages configured to generate class-rich object code.

Figure 4:
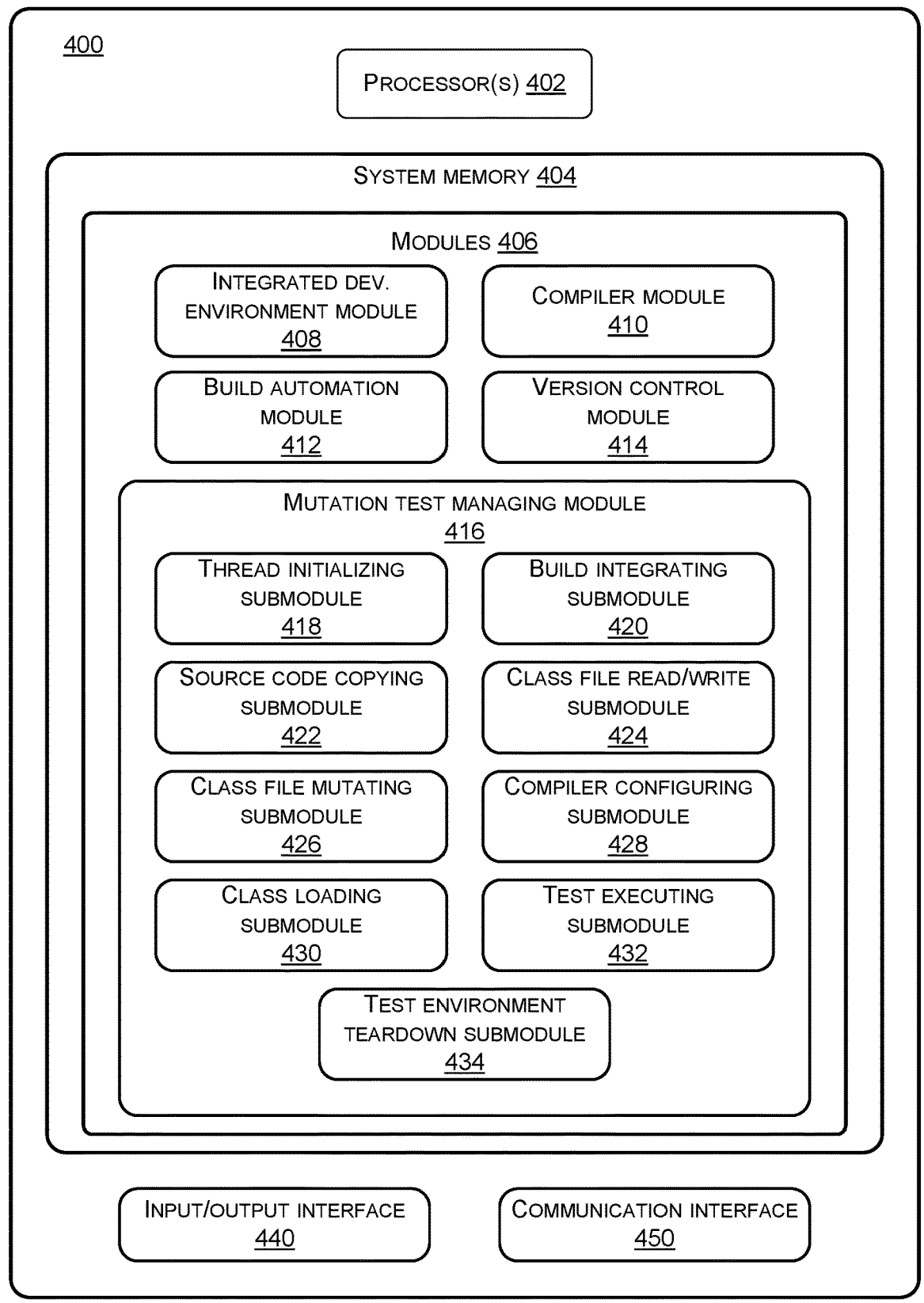
FIG. 4 illustrates an example computing host for implementing the processes and methods described herein for implementing mutation testing.

Example embodiments of the present disclosure may reduce mutation testing times substantially, compared to compiling and testing each application mutant sequentially. Recompiling individual modified class files into bytecode and replacing previously compiled bytecode with the new recompiled class files, instead of recompiling the entire software application after the source code modification, can also reduce overall mutation testing times. For example, while compiling each of hundreds of application mutants 110 in full and executing a full suite of test cases 106 against each application mutant may take years, modifying and recompiling only individual classes to generate different application mutants 110 in different parallel threads 112, and executing test cases 106 against those different application mutants 110 in different parallel threads 112, may reduce overall mutation testing times from years to days. In examples in which different test sets 116 of the test cases 106 can also be executed against individual application mutants 110 in parallel, overall mutation testing times may be further reduced from days to hours. Accordingly, the systems and processes described herein can significantly reduce overall mutation testing times, and/or reduce the amount of computing resources that are devoted to mutation testing over extended FIG. 4 illustrates an example computing host 400 for implementing the processes and methods described above for implementing mutation testing.

The techniques and mechanisms described herein may be implemented by multiple instances of the computing host 400, as well as by any other computing device, system, and/or environment. The computing host 400 may be any varieties of computing devices, such as personal computers, personal tablets, mobile devices, other such computing devices operative to perform matrix arithmetic computations. The computing host 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing host 400 may include one or more processors 402 and system memory 404 communicatively coupled to the processor(s) 402. The processor(s) 402 and system memory 404 may be physical or may be virtualized and/or distributed. The processor(s) 402 may execute one or more modules and/or processes to cause the processor(s) 402 to perform a variety of functions. In embodiments, the processor(s) 402 may include a central processing unit ("CPU"), a graphics processing unit ("GPU"), an NPU, any combinations thereof, or other processing units or components known in the art. Additionally, each of the processor(s) 402 may possess its own local memory, which also may store program modules, program data, and/or one or more operating systems.

Depending on the exact configuration and type of the computing host 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, an integrated development environment module 408, a compiler module 410, a build automation module 412, a version control module 414, and a mutation test managing module 416. The mutation test managing module 416 may further include a thread initializing submodule 418, a build integrating submodule 420, a source code copying submodule 422, a class file read/write submodule 424, a class file mutating submodule 426, a compiler configuring submodule 428, a class loading submodule 430, a test executing submodule 432, and a test environment teardown submodule 434.

The integrated development environment module 408 may be configured to perform functionality of the IDE 110 as described above.

The compiler module 410 may be configured to perform functionality of the compiler 112 as described above.

The build automation module 412 may be configured to perform functionality of the build automation tool 114A as described above.

The version control module 414 may be configured to perform functionality of the version control tool 114B as described above.

The mutation test managing module 416 may be configured to perform functionality of the mutation test manager 116 as described above, including functionality of the following submodules.

The thread initializing submodule 418 may be configured to initialize computing threads as described above with reference to step 202.

The build integrating submodule 420 may be configured to integrate with a build automation tool and trigger a build as described above with reference to step 202.

The source code copying module 422 may be configured to copy and overwrite source code and class files as described above with reference to step 206 and step 220.

The class file read/write submodule 424 may be configured to read and write a class file as described above with reference to step 208 and 212.

The class file mutating submodule 426 may be configured to mutate a class file as described above with reference to step 210.

The compiler configuring submodule 428 may be configured to configure a compiler 112 as described above with reference to step 214.

The class loading submodule 430 may be configured to load a compiled class object code into memory as described above with reference to step 216.

The test executing submodule 432 may be configured to executing pending unit tests as described above with reference to step 218.

The test environment teardown submodule 434 may be configured to configure the compiler 112 to run a test class tear down method as described above with reference to step 302.

The computing host 400 may additionally include an input/output ("I/O") interface 440 and a communication module 450 allowing the computing host 400 to communicate with other systems and devices over a network, such as other computing hosts of the service cloud network as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides a compiler operative to convert computer-executable instructions for a network data plane written in a heterogeneity-agnostic and topology-agnostic programming language into an intermediate representation, then compile the intermediate representation into multiple executable representations according to topological constraints of the network. Users may develop software-defined network functionality for a data center network composed of heterogeneous network devices by writing code in a programming language implementing heterogeneity-agnostic and topology-agnostic abstractions, while the compiler synthesizes heterogeneity-dependent and topology-dependent computer-executable object code implementing the software-defined network functionality across network devices of the data center network by analyzing logical dependencies and network topology to determine dependency constraints and resource constraints.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
  mutating, by a processor running a first computing thread among a plurality of computing threads each executing target object code in a target runtime environment, part of a class file of target source code, wherein part of the class file or a different class file of the target source code is being mutated substantially concurrently, by the processor or by a different processor, in at least one other computing thread of the plurality of computing threads, and the part of the class file of the target source code is being mutated, by the processor or by a different processor, in the at least one other computing thread in a manner heterogeneous to the mutation of the part of the class file of the target source code in the first computing thread;
  causing, by the processor, a compiler executing in the first computing thread to compile the class file of the target source code containing the mutation without compiling other class files of the target source code, resulting in generating a mutant class object code; and
  replacing, by the processor, a non-mutant object class code of the executing target object code with the mutant class object code.

2. The method of claim 1, further comprising writing, by the processor, the target source code to non-volatile storage including the class file containing the mutation before configuring the compiler.

3. The method of claim 1, wherein mutating part of the class file comprises mutating a line of code of the class file.

4. The method of claim 1, wherein mutating part of the class file is performed in accordance with one of a plurality of mutation patterns of a mutation configuration.

5. The method of claim 1, wherein the compiler is configured by the processor executing a compiler script including a parameterized call to the compiler.

6. The method of claim 5, wherein the compiler script configures a compiler target of the compiler as a Dynamic Code Evolution Virtual Machine ("DCEVM").

7. The method of claim 1, further comprising executing, by the processor in the first computing thread, pending unit tests among a test suite against the executing target object code after replacing the non-mutant object class code.

8. The method of claim 7, wherein the compiler is further configured by the processor to run a test class tear down method before the pending unit tests are executed.

9. A computing host comprising:
one or more processors; and
memory communicatively coupled to the one or more processors, the memory storing computer-executable modules executable by the one or more processors that, when executed by the one or more processors, perform associated operations, the computer-executable modules comprising:
a compiler module; and
a mutation test managing module further comprising computer-executable submodules executable by the one or more processors that, when executed by the one or more processors, perform associated operations, the computer-executable submodules comprising:
a class file mutating submodule configured to mutate, in a first computing thread among a plurality of computing threads each executing target object code in a target runtime environment, part of a class file of target source code; to mutate part of the class file or a different class file of the target source code substantially concurrently among the plurality of computing threads; and to mutate the part of the class file of the target source code among the plurality of computing threads in a heterogeneous manner in each respective computing thread;
a compiler configuring submodule configured to configure the compiler module executing in the first computing thread to compile the class file of the target source code containing the mutation without compiling other class files of the target source code, resulting in generating a mutant class object code; and
a class loading submodule configured to replace a non-mutant object class code of the executing target object code with the mutant class object code.

10. The computing host of claim 9, wherein the mutation test managing module further comprises a class file read/write submodule configured to write the target source code to non-volatile storage including the class file containing the mutation before the compiler configuring submodule configures the compiler.

11. The computing host of claim 9, wherein the class file mutating submodule is configured to mutate part of the class file by mutating a line of code of the class file.

12. The computing host of claim 9, wherein the class file mutating submodule is configured to mutate part of the class file in accordance with one of a plurality of mutation patterns of a mutation configuration.

13. The computing host of claim 9, wherein the compiler configuring submodule is configured to configure the compiler by executing a compiler script including a parameterized call to the compiler.

14. The computing host of claim 13, wherein the compiler script configures a compiler target of the compiler as a Dynamic Code Evolution Virtual Machine ("DCEVM").

15. The computing host of claim 9, wherein the computer-executable submodules further comprise a test executing submodule configured to execute, in the first computing thread, pending unit tests among a test suite against the executing target object code after the class loading submodule replaces the non-mutant object class code.

16. The computing host of claim 15, wherein the compiler configuring submodule is further configured to configure the compiler to run a test class tear down method before the test executing submodule executes the pending unit tests.

17. A computer-readable storage medium storing computer-readable instructions executable by one or more processors, that when executed by the one or more processors, cause the one or more processors to perform operations comprising:
mutating, in a first computing thread among a plurality of computing threads each executing target object code in a target runtime environment, wherein part of a class file of target source code, part of the class file or a different class file of the target source code being mutated substantially concurrently in at least one other computing thread of the plurality of computing threads, and the part of the class file of the target source code being mutated in the at least one other computing thread in a manner heterogeneous to the mutation of the part of the class file of the target source code in the first computing thread;
configuring a compiler executing in the first computing thread to compile the class file of the target source code containing the mutation without compiling other class files of the target source code, resulting in generating a mutant class object code; and
replacing a non-mutant object class code of the executing target object code with the mutant class object code.

18. The computer-readable storage medium of claim 17, wherein the operations further comprise writing the target source code to non-volatile storage including the class file containing the mutation before configuring the compiler.

19. The computer-readable storage medium of claim 17, wherein mutating part of the class file comprises mutating a line of code of the class file.

20. The computer-readable storage medium of claim 17, wherein mutating part of the class file is performed in accordance with one of a plurality of mutation patterns of a mutation configuration.

21. The computer-readable storage medium of claim 17, wherein the compiler is configured by executing a compiler script including a parameterized call to the compiler.

22. The computer-readable storage medium of claim 21, wherein the compiler script configures a compiler target of the compiler as a Dynamic Code Evolution Virtual Machine ("DCEVM").

23. The computer-readable storage medium of claim 17, wherein the operations further comprise executing, in the first computing thread, pending unit tests among a test suite against the executing target object code after replacing the non-mutant object class code.

24. The computer-readable storage medium of claim 23, wherein the compiler is further configured to run a test class tear down method before the pending unit tests are executed.

* * * * *